W. NOBLE.
CABLE CONTROLLING AND STORING MEANS FOR WINCHES.
APPLICATION FILED MAR 29, 1919.

1,364,579.

Patented Jan. 4, 1921.
3 SHEETS—SHEET 2.

Inventor
Warren Noble
by Wright, Brown, ...
Attorneys

W. NOBLE.
CABLE CONTROLLING AND STORING MEANS FOR WINCHES.
APPLICATION FILED MAR. 29, 1919.

1,364,579.

Patented Jan. 4, 1921.
3 SHEETS—SHEET 3.

Inventor
Warren Noble
by Wright Brown Quinby Hay
Attorneys

UNITED STATES PATENT OFFICE.

WARREN NOBLE, OF PROVIDENCE, RHODE ISLAND, ASSIGNOR TO N. C. L. ENGINEERING CORPORATION, OF PROVIDENCE, RHODE ISLAND, A CORPORATION OF NEW YORK.

CABLE CONTROLLING AND STORING MEANS FOR WINCHES.

1,364,579. Specification of Letters Patent. Patented Jan. 4, 1921.

Application filed March 29, 1919. Serial No. 285,993.

*To all whom it may concern:*

Be it known that I, WARREN NOBLE, a subject of the King of Great Britain, residing at Providence, in the county of Providence and State of Rhode Island, have invented new and useful Improvements in Cable Controlling and Storing Means for Winches, of which the following is a specification.

The present invention relates to winches and similar hauling or hoisting machinery, and is particularly concerned with machines of this nature having in combination drums or equivalent means for hauling in or paying out cable, a storage drum or equivalent means for storing the surplus cable, and a friction clutch or equivalent driving means having capacity for slipping or yielding, applied so to drive the storage drum, or to resist its rotation when the cable is drawn off from it, as to maintain tension in the cable between this drum and the hauling means.

The object of the invention is first, to overcome the effects of momentum and inertia in the storage drum, when the speed at which the cable is hauled in or paid out is altered; second, to provide means for causing the same friction clutch to become alternately a driving member when the cable is hauled in and a brake for the storage drum when the cable is paid out; and third, and finally, to provide various improvements in construction and arrangement contributory to the preceding objects, and for other purposes. In order better to explain these objects, I may say that one of the uses for which winches equipped with this invention are particularly adapted is that of controlling the cable of a kite balloon. In such use it is often necessary to increase or diminish the speed of hauling in or paying out the cable more or less rapidly, and frequent alternations between hauling in and paying out are required in some circumstances, particularly when the balloon is controlled from the deck of a ship at sea. It is also necessary to maintain tension in the cable between the hauling means and the storage drum to avoid slippage on the hauling means; but such tension must not be so great as either to overstrain the cable or cause it to be wound too tightly on the storage drum. To attain these ends I have provided as the immediate driving element for that drum a friction clutch which is operated with constant slip and is adjusted to maintain the necessary tension, limiting the tension to that amount, when the cable is being hauled in at any uniform speed.

Being thus adjusted, the torque of the clutch is not powerful enough to accelerate the drum instantly and in proportion to the acceleration of the hauling means when the speed of such means is increased in the course of hauling in the cable, particularly if a large mass of cable is wound on the drum, or if the increase of speed in the hauling means is sudden; and when this happens, the drum tends to log, with failure to maintain the tension and possibly allowing the cable to loop over the head of the drum and become snarled. And in paying out the cable, when any friction brake is provided to retard the storage drum, retardation of the controlling drum or shaft would cause like results to occur in consequence of the momentum of the storage drum, in the absence of means for increasing the frictional drag of such brake.

When reversals of the direction of running of the winch are necessary, as is the case, for instance, when the winch is installed on a ship to control a balloon and is driven back and forth so as to diminish the effect on the balloon of the motions of the vessel in riding the sea, it is likewise important that the cable should not be slackened between the hauling means and the storage drum, wherefore at such times the storage drum should be instantly released from the driving means and instantly put under the control of a retarding brake or vice versa. An equivalent control is needed when unwinding in order to avoid danger of the cable being slackened by overrunning of the storage drum due to its momentum when the paying out means is retarded (it may be noted that in the machine illustrated the same means is used for both hauling in and paying out).

Having regard to the foregoing objects and methods of operation the invention consists essentially in, first, the combination with a storage drum and the hauling in means of the winch, of automatic means for increasing the speed of the storage drum when the speed of the hauling in means is increased; second, an automatic control operable when paying out cable to retard the drum in approximate ratio to the rate of retardation of the paying out means; third, the provision of means by which the same friction clutch is made operable to drive the storage drum when winding in and to serve as a brake for said drum when paying out, such means also being instantly operative in transforming the clutch to serve either function; and fourth, the provision of the same control acting in combination with the same clutch either to speed up the storage drum with an increase of speed in winding in, or to retard the speed of the drum with a decrease of speed in paying out. The invention further consists in means accessory to those above outlined and contributory to the objects secured thereby, and in the novel features of construction, arrangement, and operation exhibited in the mechanism hereinafter specifically described and illustrated in the drawings, together with all equivalents thereof within the scope of the appended claims.

Figure 2:
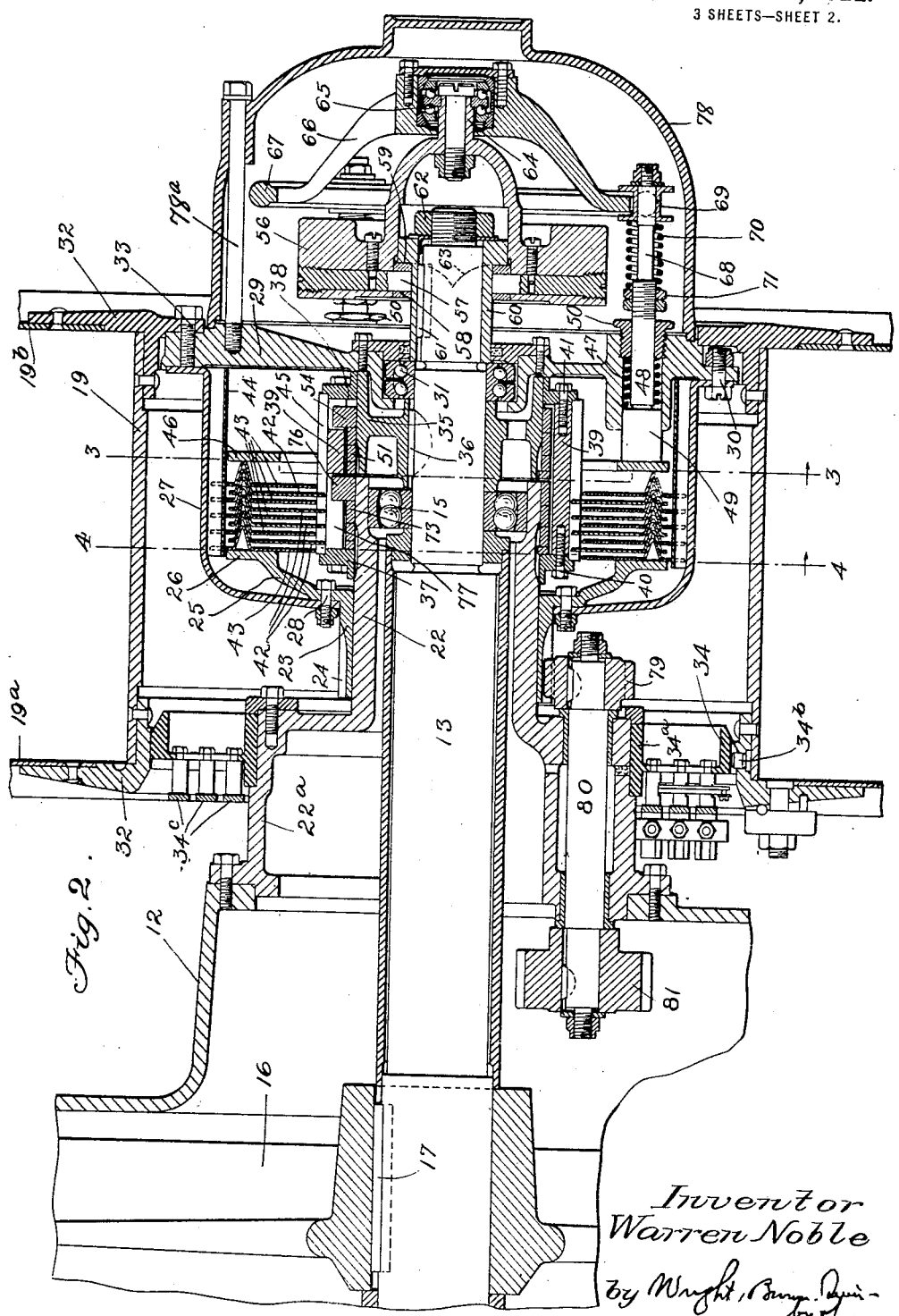
Fig. 2 is a longitudinal section of the mechanism in which the invention is particularly comprised.
Figure 3:
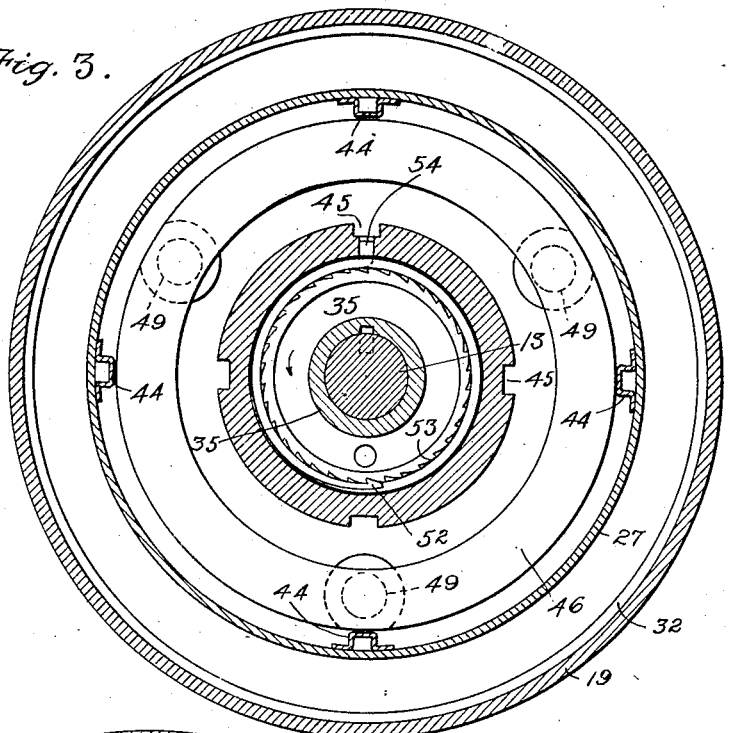
Figure 4:
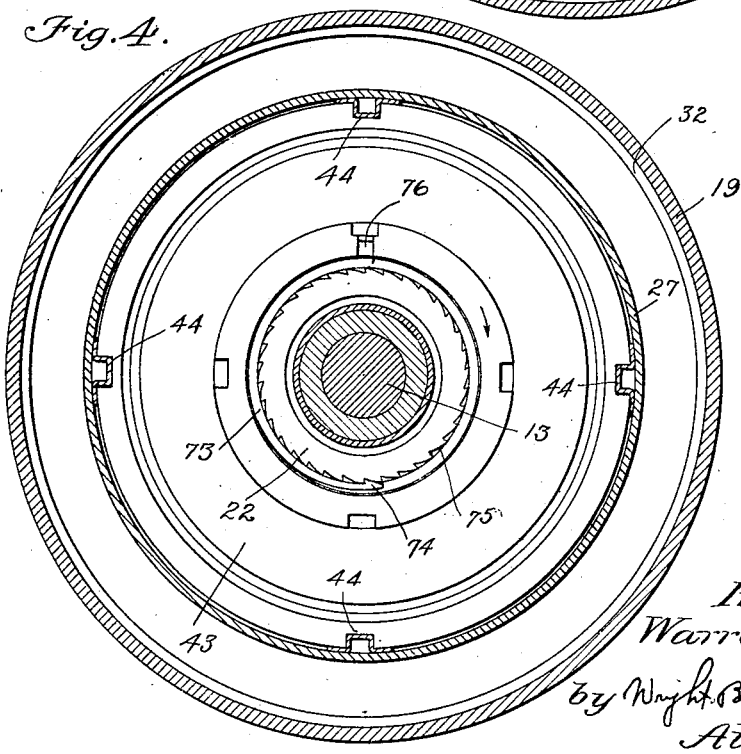

Figs. 3 and 4 are cross sections taken on the lines 3—3 and 4—4 respectively of Fig. 2.

At the outset I would say that the foregoing reference to the use of the invention in a balloon winch, and such references as may appear in the following description to that particular use, are not intended as limitations in any sense of the scope of the invention which I here claim. The invention may be applied to any machine or combination employing any sort of means for hauling in a cable of any sort whatever, together with a storage drum and means for guiding the cable from the hauling means to such storage drum.

Figure 1:
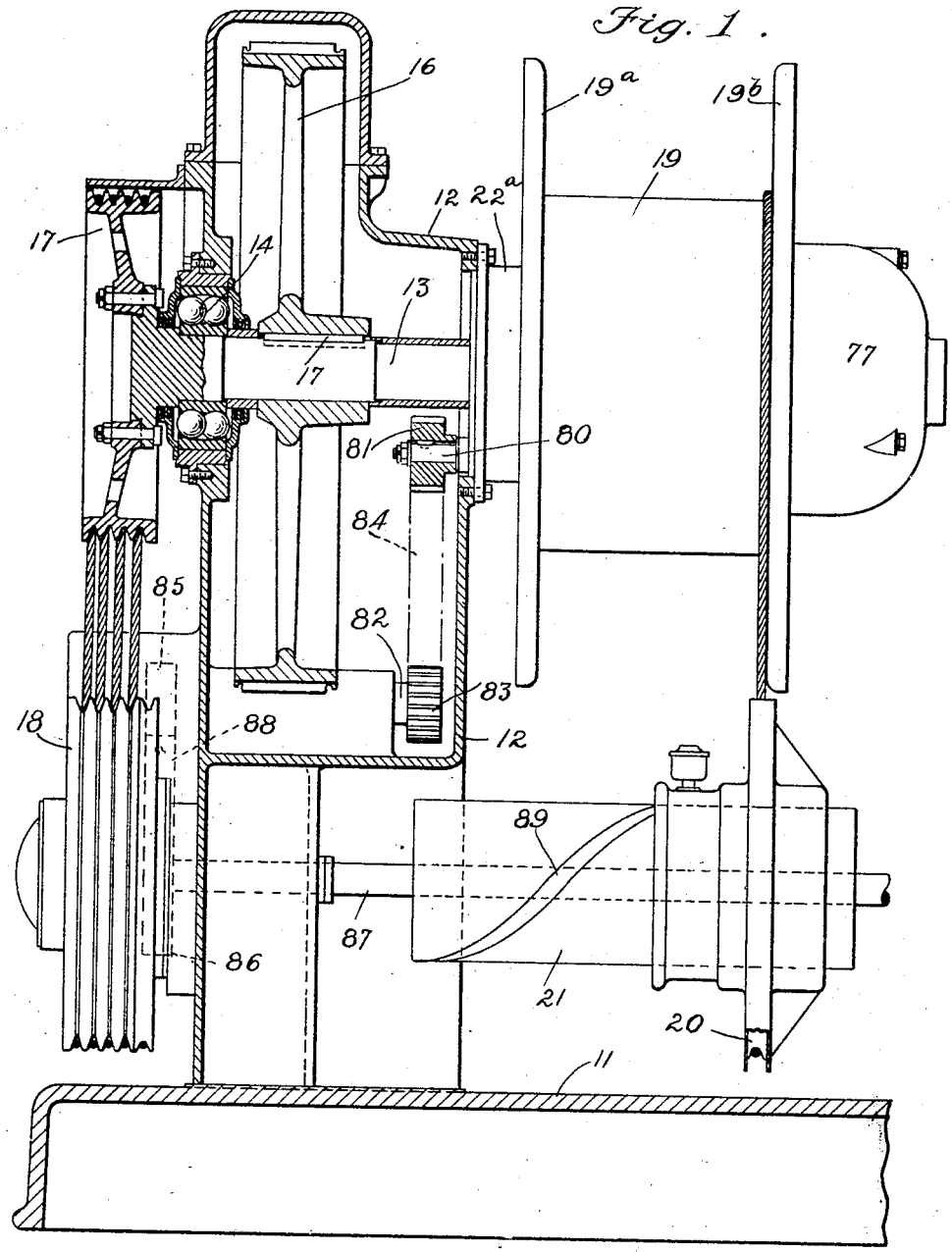
Figure 1 is an elevation of the part of a winch to which this invention is applied, showing in section a part of the driving means for such winch, and showing in elevation the storage drum or spool and the spooling mechanism for laying successive turns of the cable thereon in the proper spacing.

Referring now to the drawings, 11 represents the base of a winch or other hoisting or cable-pulling machine. 12 is a casing, having walls which are sufficiently strong and rigid to support the weight of the hauling mechanism and storage drum, together with the stresses applied by the cable being operated. In this casing there is mounted a main shaft 13, which turns in ball bearings supported by separated parts of the casing, one of the ball bearings being indicated at 14 in Fig. 2, and the other at 15 in Fig. 1. These bearings may be of any approved or standard type, the nature of which is not of importance to the disclosure of the present invention. On the shaft 13 there is mounted a driving wheel 16, secured by a key 17 or otherwise so that it cannot rotate thereon, and adapted to be driven by any suitable mechanism. I have here represented the wheel to be provided with spur teeth on its rim, for the purpose of enabling it to be driven by a link belt from a wheel or pinion on a motor-driven shaft, but, so far as the present invention is concerned, it may be driven by any other means whatever. It is sufficient for present purposes that it be understood that the wheel is driven by power, which may be derived from a steam engine, an internal combustion motor, an electric motor, or other prime mover, either directly or indirectly, and that it delivers power to the shaft 13.

On the end of the shaft 13 there is secured a pulley or drum 17. This is one of the two drums which are engaged with the cable and employed for applying pull thereto; the other drum being indicated at 18, and being mounted to rotate idly upon any sort of a pivot stud or shaft. Two pulleys or drums are provided and arranged in this manner, in order that the cable may neither run off the end of either drum nor be required to slip upon the drum to prevent so running off the end. These drums are called surge drums, and constitute the cable-hauling means of the winch. Any other means, capable of being engaged with the cable and driven or controlled to haul in and pay out the cable may be used in the winch and constitute the full equivalent of the hauling means as described and claimed in the present specification.

19 is the storage drum provided to take up the surplus of cable controlled by the winch and to which the cable is led from the surge drums 17 and 18 by any suitably arranged guides, and by a spooling drum or wheel 20, which is controlled by a cam 21 to traverse the face of the storage drum and lay successive turns of the cable on the latter close together, side by side.

Reference is now directed particularly to Fig. 2, to show the manner in which the storage drum is mounted and connected with the shaft 13. 22 is a quill, which is mounted rigidly upon the frame or case 12, having an enlarged part 22ª, which is bolted to one side of such case or frame over the opening through which the shaft 13 passes. This quill 22 surrounds the shaft and supports the bearing 15. It is finished externally to provide a bearing on which is mounted an annular gear 23, having teeth 24, and a web 25, which terminates in a thrust plate 26. A bowl-like clutch housing 27 is secured to the web of this annular gear by bolts 28, and it extends over to a disk 29, to which its rim is secured by bolts 30. This disk supports one (the right-hand) end of the storage drum 19, and is itself supported by the shaft 13, around which it is adapted to turn, running on a ball bearing 31. The drum itself is constructed with a cylindrical shell and heads 19ª and 19ᵇ, which are secured to the shell by flanged rings 32, and one of such rings is bolted to the disk 29 by a series of bolts, one of which is shown at 33. The other (left-hand) end of the drum is supported by a ring 34, having a hub 34ª, rotating on the larger part 22ª of the quill; the drum being adapted to slip on and off this ring and connected therewith by a dowel key 34ᵇ to cause rotation of the ring in unison with it, this for the purpose of driving the slip contact rings 34ᶜ, to which are connected insulated conductors embodied in the cable, and by which such conductors are joined in circuit with stationary conductors. Kite balloons used in warfare are equipped with telephone and wireless apparatus, requiring electrical connection with the anchorage, and other hoisting machines may be required to employ an electrical transmission circuit in the hoisting or hauling of the cable. The constructions now referred to, embodying the ring 34 and parts associated therewith indicate conventionally the presence of means for making electrical connection of such sorts; and I make claim to the invention embodied therein.

A drum 35 is mounted on the shaft 13, between the bearings 15 and 31, and is secured so that it cannot rotate about the shaft by a key 36. The periphery of this drum is therefore coaxial with the quill 22, and it is of substantially the same diameter as the extremity of the quill, which terminates close to the end of the drum. Surrounding the drum and also the adjacent part of the quill 22, and inclosed within the housing 27, is a clutch core or inner carrier, consisting of hubs 37 and 38 and a shell 39, all securely connected together by bolts 40, 41. The clutch core thus constructed is adapted to rotate upon the bearings furnished by the quill 22 and drum 35. This clutch core mounts upon its exterior alternate disks 42 (preferably made of steel) of a friction clutch, whereof the intermediate disks 43 (preferably of bronze) are engaged with the housing 27, which thus becomes the outer clutch carrier. The outer carrier has a number of keys 44, which enter notches in the outer peripheries of the disks 43 respectively, and the inner carrier has grooves 45 receiving key projections on the inner edges of the disks 42, whereby alternate disks are connected to one or the other of said carriers. Said keys 44 may be constructed and connected in any desired manner. I have made them by offsetting or corrugating strips of steel, and spot welding or otherwise securing them to the interior of the housing 27.

The frictional contact between the clutch disks 42 and 43 occurs, not on the flat faces of said disks, but upon annular offsets, which are V-shaped in cross section, and are nested one within the other in the manner shown clearly in Fig. 2. The angles of these annular offsets or ribs,—that is, the inclinations of their sides relatively to the planes of the disks,—are so steep that a considerable depth of penetration of each into the next is permitted, whereby a sufficient area of contact surface is provided, but the friction surfaces are so inclined that slight movements of the disks toward and from one another in an axial direction produce variations in the frictional pressure approximately proportional to the extent of such movements. The purpose of this detail of construction is to enable the frictional torque transmitted by the clutch to be increased and diminished in approximate proportion to the load required to be transmitted for causing either positive or negative acceleration in the storage drum. The face plate 26 previously mentioned is the abutment which positions the clutch disks and receives the thrust transmitted when force is applied to crowd the disks together. An annular plate 46, which surrounds the inner clutch carrier and bears against the ridge of the offset in the clutch disk at the right-hand end of the collection of disks, is the means for applying this force. This annular plate is held up against the last-named disk by springs 47, which are contained in sockets in the disk 29 and bear against shoulders 48 on bars 49, pressing the ends of such bars against the plate 46. The springs react against thimbles 50, which are screwed into the outer ends of these sockets, and form the bottoms of the sockets, making the abutments for taking the thrust of the springs. In the machine illustrated here, there are three of these springs 47 and bars 49, equally spaced around the axis of the shaft 13, wherefore only one of them appears in the axial section shown in Fig. 2.

A helical clutch is provided between the drum 35 and the carrier 39, this clutch comprising a helix 51 of stock preferably rectangular in cross section in order to give an extended bearing surface on the drum. This helix, in the proportions shown in this drawing, makes three and one half turns around the drum, and upon one end it is provided with a tooth 52, which is adapted to engage any one of a series of teeth 53 cut into a part of the periphery of the drum 35, while its opposite end is turned up to form a lug or shoulder 54, or otherwise cut or fashioned so as to make an external shoulder, which enters an opening or notch in the shell 39 of the inner clutch carrier. The teeth 52 and 53 are inclined in the manner of the teeth of a ratchet and pawl, and they form, in fact, a ratchet and pawl mechanism, which makes a positive engagement when the drum 35 is turned in the direction of the arrow in Fig. 3 faster than the storage drum tends to turn. At such times, the rotation of the drum 35 and the resistance of the storage drum cause the helical clutch 51 to be wrapped tightly about the drum 35, and thus make of itself a binder which is incapable of slipping, and transmits power in a positive manner by means of its lug or shoulder 54 to the inner clutch-carrying member. The latter drives positively the clutch disks 42, which drive the complemental clutch disks 43 frictionally, and the latter drive the storage drum positively through the keys 44 and housing 27. Thereby a driving clutch means is provided between the shaft and the storage drum, driving the latter frictionally, and adapted to slip when conditions prevent rotation of the drum at as rapid an angular speed as the shaft. The diameter of the storage drum is made slightly greater than that of the hauling drum 17, so that it tends to turn with a greater peripheral speed, whereby it applies tension to the cable being wound upon it. But the slippage of the clutch limits the tension thus applied to the cable, and it allows the drum to run progressively more slowly as the diameter of the surface on which the cable is wound increases with the accumulation of successive layers of the cable. As the effective cable-receiving diameter of the drum increases while the torque of the clutch remains constant, the tension in the cable being laid grows progressively less, which is the condition desired in a machine of this kind.

If the speed of the shaft and surge drum should be increased in the course of hauling the cable, the inertia of the storage drum would tend to cause it to lag and fail to take up the cable as fast as the latter is delivered by the surge drum, so permitting the cable to slacken more or less according to the acceleration of the surge drum. I have provided a means for overcoming such tendency by increasing the driving power of the friction clutch in that case, constructed and organized as follows. A fly wheel 56 surrounds the extremity of the shaft 13, being adapted to rotate freely relatively to it, and carries studs 57, provided with antifriction rolls 58. These bear against a cam shoulder 59 on a sleeve 60, which is keyed to the shaft by a key 61 so that it cannot rotate independently, and is held against endwise displacement by a nut 62 on the shaft. The effective cam surface at one side of the shaft is shown by dotted lines at 63 in Fig. 2, and another surface just like it is provided at the other side of the shaft. That is, the cam has two symmetrical rises at the opposite ends of a diameter, whereby, when relative rotation between the fly wheel and the cam occurs in either direction, the fly wheel is moved axially. This fly wheel has an axial extension 64, forming a pivot, and supporting a combined radial and thrust ball bearing 65 confined in a cage within the hub of a spider 66, which has a rim 67. The cage and outer rows of the ball bearing make contact on spherical zones, whereby the spider is enabled to tilt in any direction. The bars 49 previously described have stems 68, passing through thimbles 69, which are held and confined in notches in the rim 67. Each of these stems is surrounded by a spring 70, which bears against an adjustable nut 71 forming a pressure shoulder and reacts against the thimble 69.

It will now be seen that, when relative rotation between the fly wheel and the shaft occurs, the fly wheel is displaced axially by the cam surface 63, and it moves the spider in such manner as to apply force through the springs 70 against the bars 49, and so crowd the clutch disks more firmly into engagement with one another. The pressure thus applied through the springs 70 is equalized on all of the stems 68 by reason of the universal swivel mounting of the spider, and is added to the normal pressure constantly applied by the springs 47. As the fly wheel has large mass and is mounted to rotate freely, it lags behind the shaft 13 when the speed of the latter is increased, and thereby runs up on the inclined surfaces of the cam 63, until arrested by increasing resistance of the springs 70; to a distance which is generally proportional to the acceleration of the shaft. The springs 70 are provided to transmit the displacement of the fly wheel to the disk clutch, in order, first, to permit movement of the fly wheel, as described, in proportion to the acceleration of the shaft, and, second, to deliver force to the clutch in approximately the same proportion. As the total movement of the clutch disks between their fully-released position and their tightly-engaged position is minute as compared with the displacement motion of the fly wheel, or, in other words, since the fly wheel must have freedom for movement much greater than the said movements of the clutch disks in order to function as described in any approximate proportion to the shaft accelerations, any rigid unyielding transmission means between the fly wheel and the clutch disks would not permit such movements of the fly wheel. But, with springs arranged substantially as shown, the fly wheel is free to move axially of the shaft, until it is arrested by the increasing yielding resistance of the springs, and the movement thus permitted is sufficient at any time to be substantially proportional to the rate of change of rotational speed of the shaft. The springs then measure the force acting thus to displace the fly wheel, and transmit the same force to the disk clutch; and the formation of the engaging surfaces of such clutch enables the torque-transmitting friction to be likewise proportional to the same force. Thus, as the energy of the storage drum when in rotation is always proportional to the square of its speed, and, as the energy of the fly wheel is also proportional to the square of its speed, the energy change due to a change in the rate of speed of the shaft will be in correct proportion to maintain the desired cable tension between the storage drum and the surge drums of the machine.

When the winch is reversed to pay out cable, the surge drum and the storage drum are of course rotated in the opposite direction from that required to reel in the cable, and, if the friction clutch were then driven reversely, the storage drum would be rotated faster than the surge drum and would slacken the cable. But the cable must be kept taut in order to maintain friction on the surge drum and prevent looping at the storage drum, and so the friction clutch is now converted into a brake to retard the storage drum. This result is accomplished by providing a second binder clutch 73, similar in characteristics and functions to the binder clutch 51, but functioning between the fixed quill 22 and the disk clutch. The binder clutch 73 is a bar or wire, coiled helically to fit loosely around the quill 22, and has a pawl tooth or toe 74 co-acting with ratchet teeth 75 cut in the outer surface of the quill, and a lug or shoulder 76 entering a recess 77 in the inner disk clutch carrier. When the storage drum is rotated in the direction shown by the arrow in Fig. 3, by the pull of the cable being drawn from it, the binder 73 is wrapped tightly around the quill 22, being initially prevented from slipping upon the sleeve by the engagement of pawl 74 with one of the teeth 75, whereby the inner clutch carrier 39 and the clutch disks 44 are anchored without possibility of rotation. Thus the disk clutch then acts as a friction brake, retarding the rotation of the storage drum with a force which is determined by adjustment of the springs 47 by the abutment thimbles 50. When this character of motion takes place, the fly wheel 56 serves in the same manner as before described to increase the frictional power of the disk clutch, and thus prevent over-running of the storage drum and loosening of the cable in case the speed of the surge drum should be slackened.

It will be understood that the construction of the helical clutches 51 and 53 enables either to become instantly inoperative when the other is made operative by change in direction of rotation of the shaft and storage drum. When the shaft is driving through clutch 51, then force applied to the lug 76 of clutch 73 by the inner carrier 39 relaxes such clutch and allows it to turn freely around the fixed quill, the pawl end 74 thus slipping idly over the ratchet teeth; and conversely, when the shaft is reversed and the inner carrier is held fast by the clutch 73, then the rotation of drum 35 opposite to the arrow shown in Fig. 3 relaxes clutch 51, and causes the ratchet teeth 53 to pass freely under the pawl 52. Each of the clutches 51 and 73, when once tightly wrapped about the encircled part, is incapable of slipping and becomes essentially rigid with the enwrapped part. The holding power of the clutch is the friction between its turns and the encircled part, not the pawl tooth on the end of the helix. Such tooth is provided really as an anchorage to hold the clutch initially, until its wraps have been tightened about such part. Preferably the material of which these clutches are made is spring steel, and they are given such initial set that they surround the parts upon which they are applied loosely and without tendency to grip, although they may be made with the opposite tendency, if desired, without effect upon the essential features of the invention. Their form is also such that the end carrying the pawl tooth is pressed yieldingly and resiliently against the adjacent toothed surface, namely the teeth 53 and 75 respectively, whereby it automatically engages such teeth when the relative motion is in the direction to make the clutch operative.

I may, for convenience of description, call the clutches last discussed binding clutches, to distinguish them from the disk clutch, which is a friction clutch intended to slip. These binding clutches are of great value, in that they enable the friction clutch to be converted instantly from a driving mechanism to a retarding or braking means, and vice versa, thus permitting the functions of the winch in hauling in and paying out cable to be interchanged and alternated instantly and as often as may be needed, without relaxing the tension of the cable leading from the surge drum to the storage drum. Tension must be maintained in that stretch of the cable in order that no slipping of the cable on the surge drum may take place. To explain further the need for the above mentioned instantaneous reversals of function of the friction clutch the use of the winch for anchoring a captive balloon to the deck of a ship may be recalled. In this use, the winch requires constant operation, particularly when the sea is rough, in alternately taking in and paying out cable, or varying the speed of either the hauling in or the paying out, in order that the motion of the balloon may be as steady and as little affected by the rolling or pitching motion of the ship as possible. The winch operator controls the speed and direction of rotation of the surge drums, as required to overcome or diminish the effects of the ship's motion, and is able to do so without fear of the cable slipping on the surge drums or becoming loosened or fouled, through the effect of the binding clutches in instantaneously converting the friction clutch either into a driver or a brake, and through the automatic action of the fly wheel in modifying the frictional power of the friction clutch in approximate proportion to the variations of speed in either direction.

The element which I have heretofore called the fly wheel 56 has been so designated because in the present machine it is a circular body with a massive rim, substantially like a fly wheel. I need not make it in that form, however, but may give it any regular geometrical or other form, and, whatever its form may be, it will act as described, provided it is free to rotate and to move axially, and is properly poised. In function, it serves as a governor, and it may be so called. Therefore, in the foregoing specification, and in the following claims, the term fly wheel, wherever used, may be construed as synonymous with the term governor, and as including any form and construction of governor adapted to perform the functions and accomplish the results accomplished by the fly wheel governor hereinbefore described.

The governor mechanism is covered and protected by a casing or cover 78, the rim of which abuts against the outer side of the plate 29, and is secured to the latter by a sufficient number of bolts 78ª. This cover and the casing 27 previously described inclose the entire clutch and governor mechanisms.

The annular gear 24 previously mentioned controls the traversing movement of the cable-laying wheel 20, thus causing the latter to travel back and forth across the drum in a certain ratio to the speed of the drum, whatever that speed may actually be. The controlling means for this purpose comprises a gear 79, in mesh with the gear 24, a shaft 80 on which the gear 79 is secured, a second gear 81 on the shaft 80, a counter shaft 82 carrying a gear 83 which is driven from gear 81 by a belt 84, a gear 85 on shaft 82, and a gear 86 on shaft 87 of cam 21, which is driven from gear 85 by a belt 88. The belts 84 and 88 are preferably of the sort which transmit power without slip, and may be a form of the type of link belt, or any sort of a sprocket chain or perforated structure constructed to co-act with sprocket or gear teeth. Cam 21 has a groove 89, of familiar character, shaped to cause repeated back and forth traverses of the guide wheel 20.

The details of construction of the operative embodiment of my invention chosen for illustration herein are shown in the drawings with sufficient fullness and clarity, but are not further described herein because further description is deemed unnecessary to an understanding of the invention which I here claim, and they may be more or less modified without departing from the invention. Any combination of mechanisms, and any machine elements and parts of such mechanisms, having the function and mode of coöperation substantially as pointed out in the following claims, are within the scope of the protection here sought, whatever may be their specific form, construction and arrangement, unless otherwise expressly set forth by the claims.

What I claim and desire to secure by Letters Patent is:

1. In a cable-operating mechanism, the combination with hauling means and a storage drum, of a friction clutch for transmitting power to said storage drum, and automatic means for varying the torque-transmitting power of said friction clutch with variation in the speed of operation of said hauling means.

2. In a cable-operating mechanism, the combination with cable-hauling means and a cable-storing drum, of a friction clutch delivering power to drive said drum, and means automatically effective to increase the torque-transmitting power of said clutch with an increase in speed of the hauling means.

3. In a cable-operating mechanism, the combination with means for reeling in and delivering cable, of a storage drum for receiving and storing the cable as fast as it is thus delivered, a friction clutch transmitting power from said reeling-in means to the storage drum, and a governor controlling said clutch and operating automatically upon increase in the speed of said reeling-in means to increase the torque-transmitting power of said clutch in approximate proportion.

4. In a machine for paying out cable, a storage drum carrying an accumulation of cable, a paying-out drum over which the cable passes from the storage drum and the speed of which is under control, a friction brake constantly retarding rotation of the storage drum and maintaining tension in the cable, and automatic means for increasing the retarding effect of said brake when the speed of the paying-out drum changes.

5. In a machine for paying out cable, a storage drum carrying an accumulation of cable, a rotatable paying out drum to which the cable passes from the storage drum and by which the speed of its paying out is controlled, a friction brake retarding rotation of the storage drum, and operating means responsive to a change in speed of said paying out drum for increasing the retarding effect of said brake in substantially equal ratio to such speed change.

6. In a winch, in combination with a cable controlling drum operable reversely for hauling in and paying out cable, a storage drum carrying the surplus cable, a friction clutch through which such storage drum is driven from said cable-controlling drum, and automatic means for rendering said friction clutch effective as the driving means for the storage drum during hauling in of the cable and as a friction brake retarding rotation of said drum during paying out of the cable.

7. In a cable controlling machine the combination with a surge drum about which the cable passes, a shaft on which said surge drum is mounted, a storage drum for surplus cable rotatable coaxial with said shaft but independently thereof, a friction clutch interposed between said shaft and drum for driving the latter, a stationary frame element adjacent to such clutch, and means operable independently and alternately for coupling said clutch to the shaft when the drum is rotated in one direction and for coupling the clutch to said stationary part when the drum is rotated in the opposite direction, each of said means being inoperative when the other is made operative.

8. The combination with a cable controlling drum, of a storage drum for surplus cable, means for guiding the cable from one drum to the other, a friction clutch comprising coacting complemental parts one of which is engaged with the storage drum, a stationary anchorage for the other part of said clutch, a driver for the last named clutch part rigidly driven in unison with said controlling drum, and separate coupling means between the last named clutch part and said anchorage and driver respectively, said coupling means being each effective in one direction of rotation of the clutch and ineffective in the opposite direction of rotation, and being arranged oppositely to one another in respect to their actions.

9. The combination with a rotatable winding or spooling drum, of a friction clutch consisting of two main coöperating parts, one of said parts being connected to the drum, a fixed anchorage for the other of said parts, a coupling between said anchorage and said part constructed to secure the part to the anchorage when rotation of the drum occurs in one direction, and to release said part when the drum is rotated in the opposite direction, a driver, and a coupling between said driver and the last named clutch part constructed and arranged to connect said part with the driver when the latter is rotated in the second of the above-named directions, and to release when the driver is rotated in the first of said directions.

10. In a cable storage mechanism the combination with a stationary fixed quill, of a rotatable driver coaxial with said quill, a clutch carrier surrounding said quill and drum, a helical binder surrounding the quill and engaged with said carrier, a second helical binder surrounding the driver and engaged at one end with the carrier, coacting means between the opposite ends of each binder and the quill and driver, respectively, constructed and arranged to make positive connection respectively when the driver is rotated in one direction, and when the carrier is turned in the opposite direction, a storage or spooling drum, and a friction clutch consisting of coöperative parts engaged respectively with said drum and with said carrier.

11. In a winch the combination with a cable controlling drum operable reversely for respectively hauling in and paying out cable, a storage drum carrying the surplus cable, a friction clutch through which said storage drum is adapted to be driven from said cable controlling drum, automatic means for coupling said clutch with the controlling drum when the latter is rotated for hauling in, said means being automatically disconnected when the controlling drum is oppositely rotated, a fixed anchorage for the clutch, and automatic means for securing the clutch to said anchorage when the controlling drum is rotated in the paying out direction, the latter means being inoperative during the hauling in rotation, whereby the same clutch serves alternately as driving means and as a brake for the storage drum according as the cable is hauled in or paid out.

12. In a winch the combination with a cable controlling drum rotatable oppositely for hauling in and paying out cable respectively, a storage drum carrying the surplus cable, a friction clutch through which said storage drum is driven from the cable controlling drum, automatic means for rendering said friction clutch effective to drive the storage drum during hauling in of the cable, and effective as a brake to retard rotation of the storage drum when the cable is paid out, and means for increasing the frictional power of such clutch, when change of speed of the controlling drum occurs running in either direction.

13. In a winch the combination with a cable controlling drum rotatable oppositely for hauling in and paying out cable respectively, a storage drum carrying the surplus cable, a friction clutch through which said storage drum is driven from the cable controlling drum, automatic means for rendering said friction clutch effective to drive the storage drum during hauling in of the cable and effective as a brake to retard rotation of the storage drum when the cable is paid out, and means for increasing the frictional power of such clutch when the speed of the controlling drum is increased during its hauling in rotation and when the speed of the same drum is diminished during its paying out rotation.

14. The combination with a shaft, of a drum, a friction clutch interposed between said shaft and the drum, one of the complemental coöperating parts of which clutch is engaged with the shaft and the other complemental part of the clutch is engaged with the drum, a governor rotatable with the shaft and being movable by inertia relatively thereto when the speed of the shaft is varied, and means through which the governor in its relative movement increases the friction-causing pressure of said clutch.

15. The combination with complemental clutch members, of two parts between which relative rotation may take place, one of said clutch members being connected to one of said parts, and the other of said clutch members connected to the other of said parts, a shaft, a governor engaged to be driven by said shaft and mounted with provision for movement relatively to the latter when a change in the speed of the shaft occurs, and means operated by the governor in the course of such relative movement to increase the friction-causing pressure between said clutch members.

16. The combination with a friction clutch consisting of a series of members, two relatively rotatable parts, one of said parts being connected with alternate members of said clutch, and the other of said parts being connected with the intermediate members of the clutch, a shaft, a fly wheel governor mounted coaxially with said shaft and being movable both rotatably and axially relatively to the shaft, a cam carried by the shaft having a surface inclined to the axis arranged to apply driving force to said governor and to cause axial displacement thereof when a change in the speed of the shaft occurs, and pressure-applying means connected with said governor and operated by axial displacement thereof arranged to exert force upon the members of said clutch pressing them together.

17. A friction clutch comprising complemental coöperating members having conical engaging surfaces, two relatively rotatable parts mounted coaxially with the said conical surfaces, a shaft, a fly wheel governor mounted coaxially with said shaft and being rotatable and axially displaceable with respect thereto, a cam carried by the shaft having a surface axially inclined arranged to apply force to the governor and rotate the same and to cause axial displacement thereof when the speed of the shaft is changed, and pressure transmission means arranged and operated by the governor when the latter is displaced to press said clutch members more forcibly together.

18. A friction clutch comprising complemental coöperating members having conical engaging surfaces, two relatively rotatable parts mounted coaxially with said conical surfaces, a shaft, a fly wheel governor mounted coaxially with said shaft and being rotatable and axially displaceable with respect thereto, a cam carried by the shaft having a surface axially inclined arranged to apply force to the governor and rotate the same and to cause axial displacement thereof when the speed of the shaft is changed, and pressure transmission means arranged and operated by the governor when the latter is displaced to press said clutch members more forcibly, said transmission means including springs adapted to yield when the governor is thus displaced and to exert the force thus imposed upon them against the clutch members.

19. In a clutch controlling mechanism the combination with complemental clutch members rotatable in unison and relatively movable axially, of a shaft, a governor rotatable with and relatively to said shaft and also axially movable thereof, a cam arranged to transmit rotation from the shaft to the governor, constructed also to displace the governor axially when change in the speed of the shaft occurs, and pressure transmitting means including a yielding spring arranged between said governor and the clutch and adapted to press the clutch members together when such axial displacement of the governor occurs.

20. In a clutch-controlling mechanism the combination with clutch-connected parts, of a clutch intermediate said parts and comprising disks alternately engaged with the respective parts and having annular V-shaped offsets, the offset of one disk entering that of the adjacent disk whereby contact is made between the complemental conical surfaces of said offsets, and means for exerting pressure in the axial direction between said disks; the conical arrangement of the engaging surfaces thereof causing the torque-transmitting power of the clutch to be substantially proportional to the intensity of the pressure so applied.

21. In a friction torque-transmitting apparatus the combination with relatively rotatable parts and complemental frictional surfaces connected respectively with said parts, of an interior member surrounded by one of said parts, and a binder coiled about said interior member and connected with the last named of said parts, being arranged to be wrapped tightly about the interior member when rotative effort of the said part occurs in one direction, and to be relaxed when rotative effort occurs in the opposite direction.

22. In a driving mechanism, coaxial relatively rotatable driving and driven members, and a binder clutch between said members constructed as a spring helix surrounding one of the members and connected with the other of the members, the surrounded member and the binder clutch having complemental shoulders adapted to be engaged when relative movement between the driving and driven members occurs in one direction, whereby to cause the binder clutch to be drawn tight about the surrounded member.

23. The combination with two substantially coaxial relatively rotatable members, of a binder clutch constructed as a spring helix arranged coaxial with and in close proximity to the cylindrical surface of one of said members, and connected at a point adjacent to one of its ends with said member, its other end having an abutment adapted to be arrested by a complemental abutment on the other member when relative rotation occurs in one direction.

24. The combination with two substantially coaxial relatively rotatable members, of a binder clutch constructed as a spring helix arranged coaxial with and in close proximity to the cylindrical surface of one of said members, and connected at a point adjacent to one of its ends with said member, its other end having an abutment adapted to be arrested by a complemental abutment on the other member when relative rotation occurs in one direction, said complemental abutments being constructed to slip past one another when relative rotation takes place in the opposite direction.

25. In combination with a winch, a cable storing drum, and complemental electrical slip contacts respectively carried by said drum and mounted upon a fixed part of the winch, said contacts being adapted for connection with an electrical conductor embodied in the cable and with a stationary conductor, respectively.

In testimony whereof I have affixed my signature.

WARREN NOBLE.